United States Patent
Bergstrom et al.

(10) Patent No.: US 9,492,845 B2
(45) Date of Patent: Nov. 15, 2016

(54) TRIM STRUCTURE FOR A VEHICLE

(71) Applicant: VOLVO CAR CORPORATION, Gothenburg (SE)

(72) Inventors: Anders Bergstrom, Gothenburg (SE); Conny Blomme, Gothenburg (SE); Clas Lindqvist, Torslanda (SE)

(73) Assignee: VOLVO CAR CORPORATION (SE)

( * ) Notice: Subject to any disclaimer, the term of this patent is extended or adjusted under 35 U.S.C. 154(b) by 281 days.

(21) Appl. No.: 14/019,853

(22) Filed: Sep. 6, 2013

(65) Prior Publication Data

US 2014/0072773 A1 Mar. 13, 2014

(30) Foreign Application Priority Data

Sep. 11, 2012 (EP) ..................................... 12183827

(51) Int. Cl.
| | |
|---|---|
| *B05D 5/06* | (2006.01) |
| *C08J 7/04* | (2006.01) |
| *B05D 1/36* | (2006.01) |
| *B05D 1/38* | (2006.01) |

(Continued)

(52) U.S. Cl.
CPC . *B05D 5/06* (2013.01); *B05D 1/36* (2013.01); *B05D 1/38* (2013.01); *B05D 3/12* (2013.01); *B05D 7/02* (2013.01); *B05D 7/52* (2013.01); *B05D 7/54* (2013.01); *B60R 13/04* (2013.01); *C08J 7/04* (2013.01); *C08J 7/042* (2013.01); *B05D 2201/00* (2013.01); *B05D 2201/02* (2013.01); *Y10T 29/49* (2015.01); *Y10T 428/24628* (2015.01); *Y10T 428/24802* (2015.01)

(58) Field of Classification Search
CPC ............ B05D 1/36; B05D 1/38; B05D 5/06; B05D 7/12; B05D 7/52; B05D 7/54; B05D 2201/00; B05D 2201/02; C08J 7/04; C08J 7/072
USPC ....... 427/256, 258, 259, 261, 270, 271, 275, 427/276, 286
See application file for complete search history.

(56) References Cited

U.S. PATENT DOCUMENTS

| | | | |
|---|---|---|---|
| 4,578,281 | A | 3/1986 | Ebisawa et al. |
| 4,778,550 | A | 10/1988 | Barton et al. |

(Continued)

FOREIGN PATENT DOCUMENTS

| | | |
|---|---|---|
| EP | 0079973 A2 | 6/1983 |
| JP | 04103446 A | 4/1992 |
| JP | H04-103446 A * | 4/1992 |

OTHER PUBLICATIONS

European Search Report Dated May 3, 2013, Application No. 12183827.0-1503, Applicant Volvo Car Corporation, 12 Pages.

*Primary Examiner* — William Phillip Fletcher, III
(74) *Attorney, Agent, or Firm* — Brooks Kushman P.C.

(57) ABSTRACT

A trim structure for a vehicle includes at least two surface regions having different surface appearances and is manufactured in one unit. A method for providing a trim structure for a vehicle with at least two surface regions having different surface appearances comprises the steps of: a) providing a first surface appearance on at least a portion of an external surface of a trim structure body; b) providing a second surface appearance by applying a material layer on top of at least a part of the at least a portion having the first surface appearance; and c) removing a portion of the applied material layer, thereby revealing at least a portion of the under-lying first surface appearance.

19 Claims, 5 Drawing Sheets

(51) Int. Cl.
 *B05D 3/12* (2006.01)
 *B05D 7/02* (2006.01)
 *B05D 7/00* (2006.01)
 *B60R 13/04* (2006.01)

(56) References Cited

U.S. PATENT DOCUMENTS

| | | |
|---|---|---|
| 4,844,947 A | 7/1989 | Kasner et al. |
| 4,868,021 A | 9/1989 | Zoller |
| 5,151,307 A | 9/1992 | Jackson |
| 5,240,751 A | 8/1993 | Cakmakci |
| 2006/0024476 A1 | 2/2006 | Leland et al. |
| 2006/0051519 A1* | 3/2006 | Dixon ............ B05D 3/0209 427/487 |
| 2006/0188652 A1* | 8/2006 | Tansey ............ B05D 5/065 427/256 |
| 2008/0241478 A1 | 10/2008 | Costin et al. |

* cited by examiner

TRIM STRUCTURE FOR A VEHICLE

CROSS-REFERENCE TO RELATED APPLICATIONS

This application claims foreign priority benefits under 35 U.S.C. §119(a)-(d) to European patent application number EP 12183827.0, filed Sep. 11, 2012, which is incorporated by reference in its entirety.

TECHNICAL FIELD

The present disclosure relates to a trim structure for a vehicle, wherein the trim structure has at least two surface regions having different surface appearances. The disclosure further relates to a method for providing a trim structure for a vehicle.

BACKGROUND

Trim structures are commonly used exteriorly and/or interiorly in a vehicle. It may, at least partly, enclose a vehicle structure, such as a window, a door, a tailgate, a grill or a grip. Alternatively, it may, at least partly, enclose more than one vehicle structure, for example a green-house trim, which encloses a window section at a side of the vehicle. The trim structure may be in the form of a metal strip, which is partly straight and/or partly curved such that it is adapted to fit around the vehicle structure it encloses. The trim structure may also serve a decorative purpose. According to known technology, trim structures may for example be made of shiny metal or have the same color as the rest of the vehicle.

It is known to use trim structures having two different surface appearances, for example for a green-house trim. A portion of the surface of the trim structure may have a first surface appearance, e.g., a first region with a shiny metal surface, and another portion may have a second surface structure, e.g., a second region having the same color as the rest of the vehicle. A known manufacturing method to provide this kind of trim structure is making two separate units, a first unit having the first surface appearance and a second unit having the second surface appearance and then combining the two units to form the trim structure. The two units may for example be snap fitted, welded or glued to each other.

However, combining two different units may cause problems. There may be tolerance problems between the two units. The two units may have different material properties, e.g., as regards thermal expansion. It may further be difficult to make trim structures having a curved shape of two different materials, since there may appear an interspace between the two units, when bending the trim structure in order to achieve the desired curvature.

SUMMARY

An object of the present disclosure is to overcome or ameliorate at least one of the disadvantages of the prior art, or to provide a useful alternative.

It is desirable to provide an improved trim structure having at least two surface regions having different surface appearances.

It is further desirable to provide a trim structure which is easy to manufacture.

Thus, in a first aspect of the present disclosure there is provided a trim structure for a vehicle, the trim structure having at least two surface regions having different surface appearances, wherein the trim structure is manufactured in one unit.

Such a trim structure has at least two surface regions having different surface appearances. It is further easy to manufacture, since it is made in one unit.

The at least two surface regions may differ regarding color, reflectance, surface structure and/or surface material. For instance, one surface region is provided with a shiny appearance and one surface is provided with a matt appearance.

The trim structure may have an elongated and/or curved shape, e.g., a shape adapted to fit around at least a part of a window or a grill of the vehicle. The trim structure may be adapted to fit around a window section, such as for a green-house trim.

According to an embodiment of the disclosure, the trim structure further comprises an end cap at an end of the trim structure, the end cap being formed in one unit with the trim structure. According to prior art solutions for a trim structure made of two separate units, which are combined, a separate end cap is used. By instead using an integrated end cap an extra assembly step is omitted. There is further no risk that the end cap may fall off.

A suitable material for the trim structure is a metal or alloy, e.g., aluminum. The trim structure may for example be manufactured by extrusion or pressing.

In a second aspect of the present disclosure there is provided a method for providing a trim structure for a vehicle with at least two surface regions having different surface appearances, the method comprising the steps of:

a) providing a first surface appearance on at least a portion of an external surface of a trim structure body, b) providing a second surface appearance by applying a material layer on top of at least a part of the portion having the first surface appearance, c) removing a portion the applied material layer, thereby revealing at least a portion of the under-lying first surface appearance.

Also the first surface appearance may be provided by applying a material layer. In that case the material layer of step a) would be different from that of step b).

The term external surface is herein used for a surface which is visible when the trim structure is mounted in a vehicle.

Providing the first or second surface appearance in step a) or b) may comprise applying a paint layer, e.g., by painting or spraying.

Providing the first or second surface appearance in step a) or b) may comprise anodising the external surface of the trim structure body. Anodizing is used to provide an oxide layer on the surface of a metal part, e.g., aluminum. Oxygen is taken from e.g., the air in order to form the oxide layer. Anodizing is thus an example of applying a material layer. Further, anodising may be combined by dyeing of the anodised layer in order to obtain a colored layer.

Step a) may comprise providing the first surface appearance by means of polishing the external surface of the trim structure body. Thereby, a shiny metal surface may be obtained.

Step a) and/or c) may be followed by a step of applying a protective coating. The protective coating is preferably transparent or translucent. A first protective coating may be applied after step a) and a second protective coating may be applied after step c). Both the first and the second protective coatings are optional, meaning that one or both of them may be omitted. However, it is normally advantageous to cover the surface of the trim structure with at least one protective coating, which in that case is made after step c).

If using the above-mentioned first protective coating, the process of removal in step c) will be less sensitive, since it does not matter if also a part of the first protective coating is removed when removing the applied material layer. The thickness of the first protective coating thus adds tolerance to the removal process in step c).

In an embodiment of the disclosure, the method comprises the steps of:

a) providing the first surface appearance on at least a portion of the external surface of a trim structure body by applying a first paint layer, b) providing the second surface appearance, which at least partly is located on top of the first paint layer, by applying a second paint layer at least partly on top of the first paint layer, c) removing a portion of the second paint layer, thereby revealing at least a portion of the under-lying first paint layer, d) applying a protective coating on top of at least a part of the first and/or second paint layers.

The first surface appearance is thus provided by the first paint layer and the second surface appearance by the second paint layer. Step d) is optional as mentioned above. There may also be an extra step of applying a protective coating in between steps a) and b), as also mentioned above.

In another embodiment of the disclosure, the method comprises the steps of:

a) using the surface of the trim structure body as the first surface appearance, b) providing a second surface appearance by applying a paint layer on at least a portion of the external surface of the trim structure body, c) removing a portion of the paint layer, thereby revealing at least a portion of the under-lying first surface appearance.

d) applying a protective coating on top of at least a part of the surface of the trim structure body and/or on top of the paint layer.

The first surface appearance is thus provided by the trim structure body itself, which e.g., may be polished to obtain a shiny metal surface. The second surface appearance is provided by the paint layer. Step d) is optional as mentioned above. There may also be an extra step of applying a protective coating in between steps a) and b).

Step c) may comprise grinding, milling, laser cutting and/or polishing in order to remove the applied material layer.

The method may further comprise the additional step of: bending the trim structure in order to achieve a curved shape, which additional step preferably is performed before steps a)-d).

The method may further comprise the additional step of forming an end cap in one unit with the trim structure at an end of the trim structure.

Thereby an extra assembly step of fastening the end cap is omitted.

BRIEF DESCRIPTION OF THE DRAWINGS

The present disclosure will hereinafter be further explained by means of non-limiting examples with reference to the appended drawings wherein.

It should be noted that the appended drawings are not necessarily drawn to scale and that the dimensions of some features of the present disclosure may have been exaggerated for the sake of clarity.

DETAILED DESCRIPTION

The disclosure will, in the following, be exemplified by embodiments. It should however be realized that the embodiments are included in order to explain principles of the disclosure and not to limit the scope of the invention, defined by the appended claims. Details from two or more of the embodiments may be combined with each other.

Figure 1A:
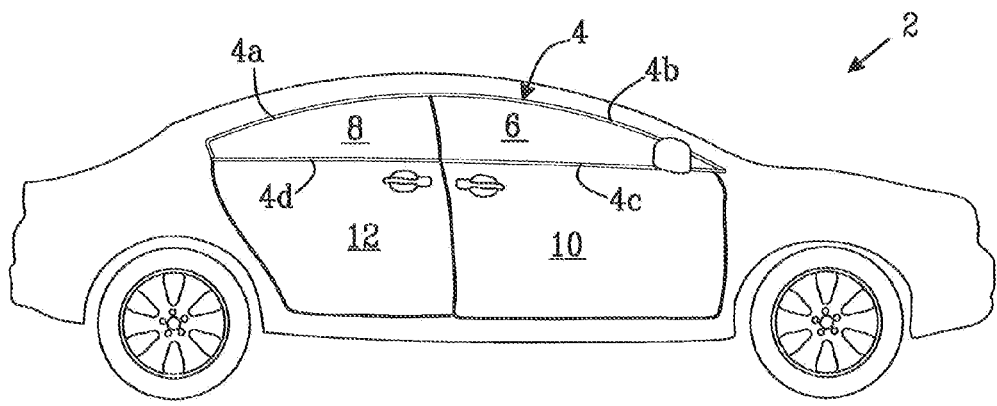
FIG. 1a is a schematic view of a vehicle comprising a green-house trim.

FIG. 1a schematically illustrates a vehicle 2 comprising a green-house trim 4 surrounding the front side window 6 and the rear side window 8. The green-house trim 4 comprises four parts; each of them forming a trim structure: a rear upper portion 4a, a front upper portion 4b, a front lower portion 4c and a rear lower portion 4d. The rear upper portion 4a and the front upper portion 4b are separated by edges of the doors 10, 12. In the same way, the front lower portion 4c and the rear lower portion 4d are also separated by the edges of the doors 10, 12. Further, the rear upper portion 4a and the rear lower portion 4d are illustrated as being separate from each other, but, alternatively the rear upper portion 4a may transform into the rear lower portion 4d without interruption, such that they form one trim structure. In the same way, the front upper portion 4b is separate from the front lower portion 4c. The separation may be hidden by the fastening means of a rear-view mirror. Alternatively, the front upper portion 4b may transform into the front lower portion 4c without interruption, such that they form one trim structure.

Figure 1B:
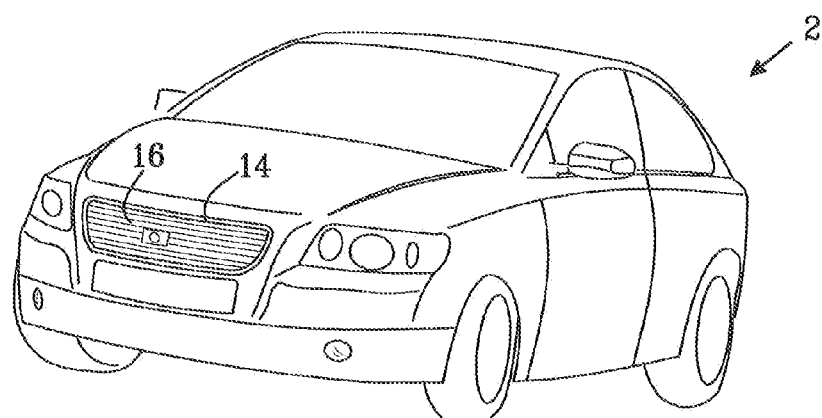
FIG. 1b is a schematic view of a vehicle comprising a grill trim.

FIG. 1b schematically illustrates a grill trim structure 14. The grill trim structure 14 is made in one piece, which has been bent in order to fit the shape of a grill 16.

Figure 2:
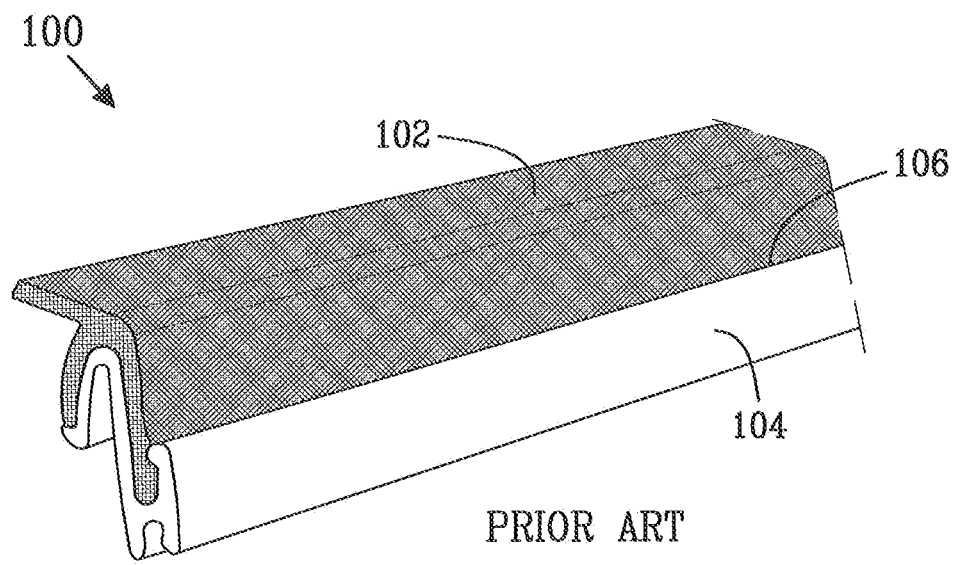
FIG. 2 illustrates a perspective cross-section of a trim structure according to prior art.

FIG. 2 illustrates a perspective cross-section of a trim structure 100 according to prior art. The trim structure 100 comprises a first unit 102 having a first surface appearance, e.g., being painted, and a second unit 104 having a second surface appearance, e.g., shiny metal. The first unit 102 is snap-fitted into the second unit 104 or vice versa. The shapes of the two units 102, 104 are adapted to each other, such that the units are held together, once they have been snap-fitted to each other. However such a trim structure 100 may suffer problems due to different material properties of the two units 102, 104, e.g., as regards thermal expansion. Even for the case when they are made of the same kind of material and one unit is painted and the other not, the amount of heat transferred to the unit will depend on the color of the unit. Purely as an example, a unit painted black will absorb more sun-shine than a unit having a metal surface, which may lead to different thermal expansion. It may also cause problems to make a trim structure with a curved shape, as for example the rear upper portion 4a and the front upper portion 4b of the vehicle 2 of FIG. 1, since there may appear an interspace between the two units 102 and 104 when bending the trim structure 100 in order to achieve the desired curvature.

Figure 3:
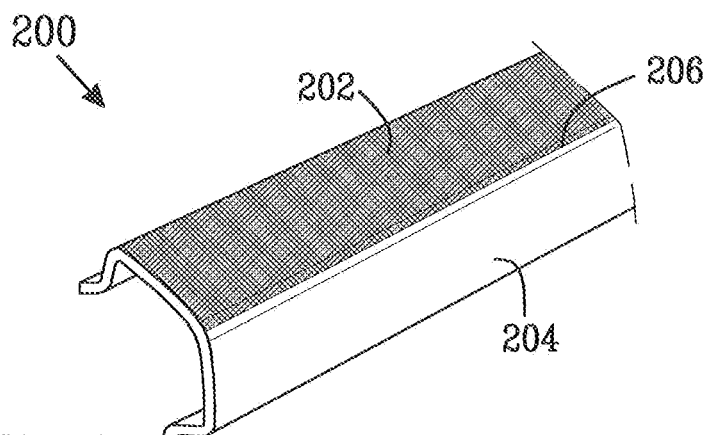
FIG. 3 illustrates a perspective cross-section of a trim structure according to the disclosure.

FIG. 3 illustrates a perspective cross-section of a trim structure 200 according to the disclosure. The trim structure 200 comprises a first surface region 202 having a first surface appearance, e.g., a colored surface, and a second surface region 204 having a second surface appearance, e.g., shiny metal or another color. The two surface regions 202, 204 have been manufactured in one unit, e.g., by extrusion. Together they form one unit. Therefore it is easy to bend the trim structure 200 in order to provide a curved shape of the trim structure 200, such as the rear upper portion 4a and the front upper portion 4b of the vehicle 2 of FIG. 1.

If using a trim structure 200 being manufactured in one unit, the boundary line 206 between the two surface regions 202, 204 may be arbitrarily selected. One surface region 202 may for example be located as "islands" in a "sea" of the other surface region. A striped, checkered or dotted pattern may be selected. Text or logos may be formed. There is thus a wide choice of patterns when selecting surface structures for a trim structure according to the disclosure. It is also possible to use a third surface region, a fourth surface region, etc. It would not be possible to use such irregular patterns, if using two separate units 102, 104 as in the prior art trim structure 100 of FIG. 2, where the boundary line 106 between the two surface regions 102, 104 will follow the geometries of the edges of the two units 102, 104.

Figure 4A:
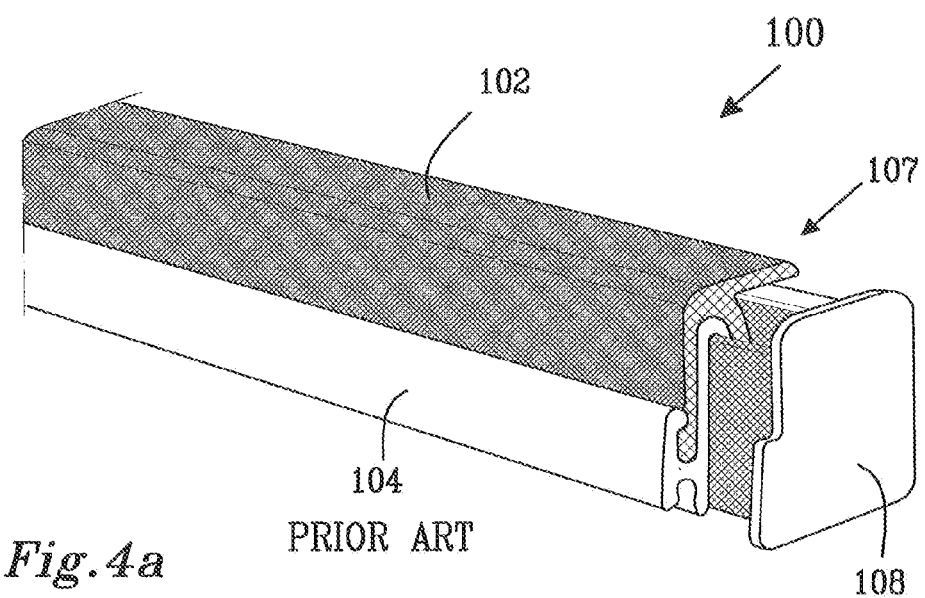
FIG. 4a illustrates an end cap of a trim structure according to prior art.

FIG. 4a illustrates an end 107 of a trim structure 100 according to prior art, e.g., the one illustrated in FIG. 2 in an exploded view. The end 107 may for example be located at the edges of the doors 10, 12 of the vehicle 2 of FIG. 1. The end 107 of the trim structure 100 is closed by and end cap 108.

Figure 4B:
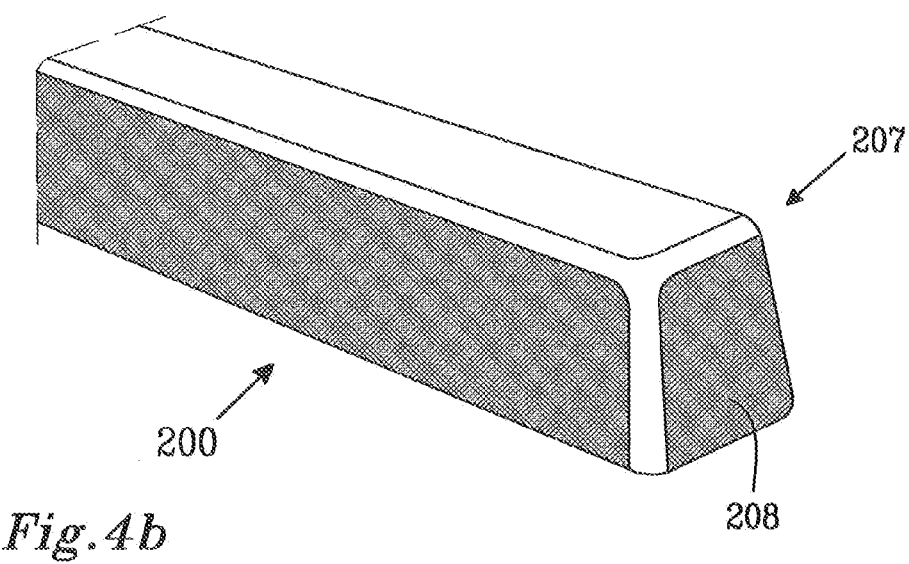
FIG. 4b illustrates an end cap of a trim structure according to the disclosure.

FIG. 4b illustrates an end 207 of a trim structure 200 according to the disclosure. In order to give the trim structure 200 a smooth end 207, an end cap 208 is integrally formed of the same material as the rest of the trim structure 200, such that the end cap 208 forms one unit with the rest of the trim structure 200. If instead using a prior art trim structure 100 like the one of FIG. 2, a separate end cap would be needed. However, as an alternative to the integrated en cap 208, a separate end cap 108 may be used for trim structure 200 according to the disclosure as well.

FIGS. 5a-e illustrate steps of a method according to the disclosure. The trim structure comprises a trim structure body 209 whereupon different surface appearances are applied. The thickness of the different layers is exaggerated in order to make the layers more easily visible.

Figure 5:
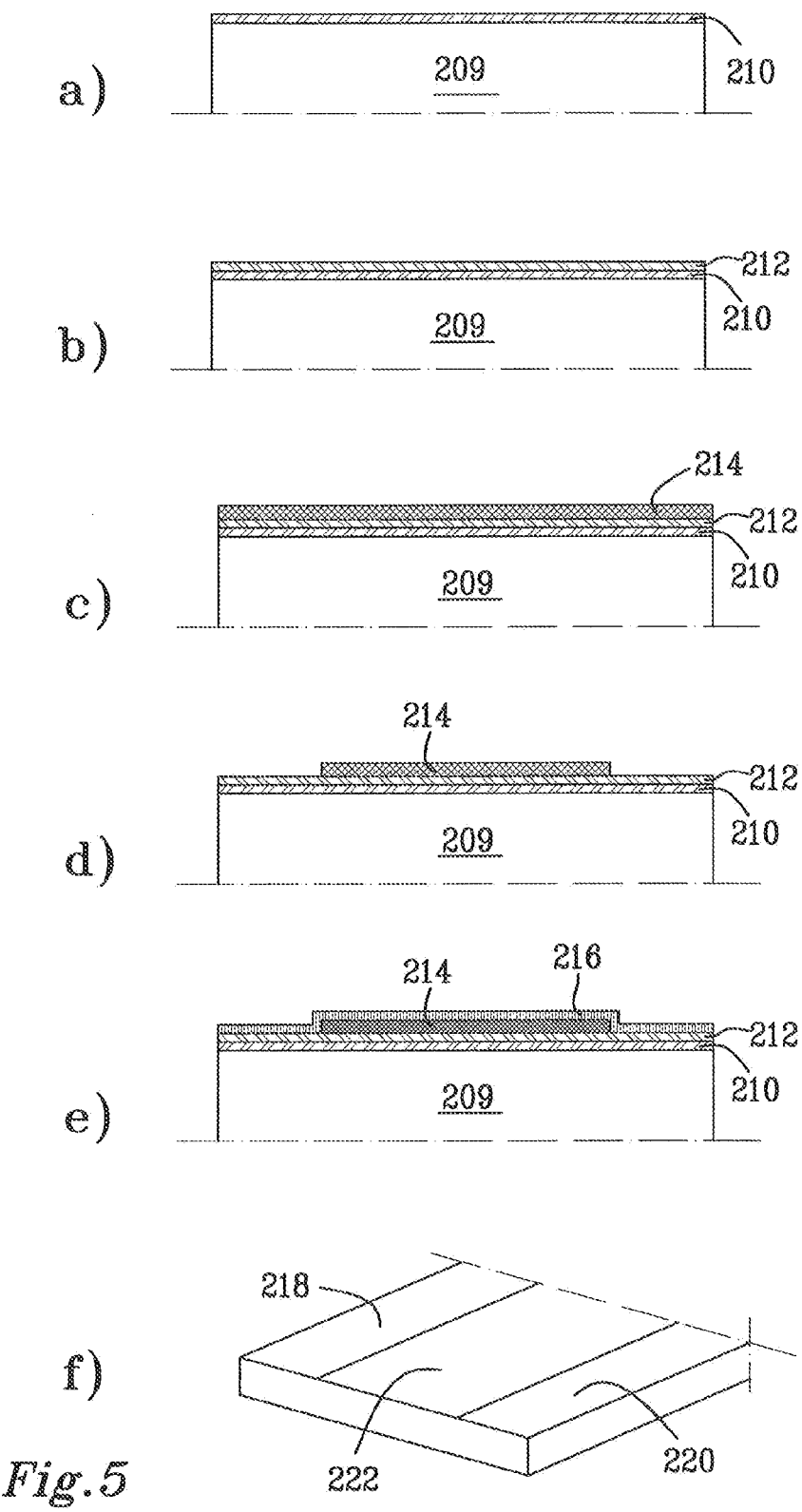
FIG. 5 illustrates steps of a method according to the disclosure.

In FIG. 5a a first surface appearance is provided in the form of applying a first paint layer 210 on top of a trim structure body 209. The paint layer may be applied by painting or spraying. Thereafter, a first protective coating 212 is applied on top of the first paint layer 210. See FIG. 5b. The protective coating may be applied by painting or spraying. The first protective coating 212 is preferably transparent. If the first paint layer 210 does not cover the whole surface of the trim structure body 209, the first protective coating 212 may also be applied directly on top of the trim structure body 209. Then a second surface appearance is provided in the form of applying a second paint layer 214. The second paint layer 214 may be located on top of the first protective coating 212, on top of the first paint layer 210 or on top of the trim structure body 209. However, in the embodiment of the disclosure disclosed in FIG. 5, the second paint layer 214 is applied on top of the first protective coating 212 only, see FIG. 5c. After that, a portion of the second paint layer 214 is removed, thereby revealing the underlying first paint layer 210 visible through the first protective coating 212, see FIG. 5d. Then a second protective coating 216 is applied. See FIG. 5e. The second protective coating 216 is preferably transparent. The second protective coating 216 covers the second paint layer 214 and may also be arranged to cover, at least partly, the first protective coating 212, the first paint layer 210 and/or the trim structure body 209. The second protective coating 216 may cover the whole external surface of the trim structure 200.

FIG. 5f illustrates the trim structure 200 of FIG. 5e in a perspective view. The trim structure 200 comprises three surface regions. Two of them 218, 220 have the first surface appearance, wherein the first paint layer 210 is seen through the first protective coating 212 and the second protective coating 216. There is also another surface region 222 having a second surface appearance, wherein the second paint layer 214 is seen through the second protective coating 216.

The first protective coating 212 and the second protective coating 216 are optional. One, or both, of them may be omitted. However, it is normally suitable to cover the external surface of the trim structure 200 with at least one protective coating.

If using the above-mentioned first protective coating 212, the process step of removing the second paint layer 214 will be less sensitive, since it does not matter if also a part of the first protective coating 212 is removed. The thickness of the first protective coating 212 thus adds tolerance to the removal process step.

FIGS. 6a-e illustrate steps of another method according to the disclosure. The method differs from that of FIGS. 5a-e in that the surface of trim structure body 209 is used as the first surface appearance. It may e.g., be polished in order to obtain a shiny metal surface, see FIG. 6b. A paint layer 214 is applied, see FIG. 6c. After that, a portion of the paint layer 214 is removed, thereby revealing the underlying surface of the trim structure body 209, see FIG. 6d. Then a second protective coating 216 is applied. See FIG. 6e.

Figure 6:
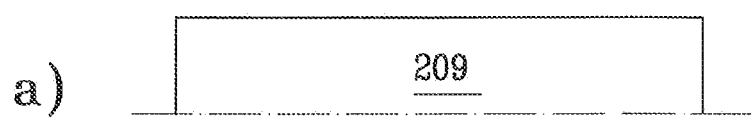
FIG. 6 illustrates steps of another method according to the disclosure.
Figure 6:
Figure 6:
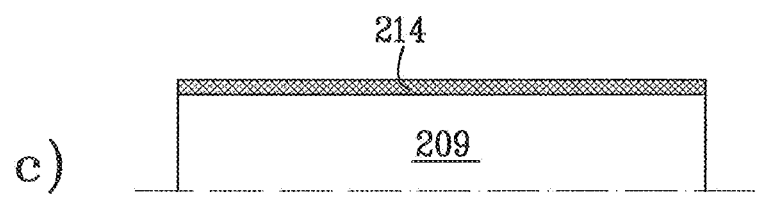
Figure 6:
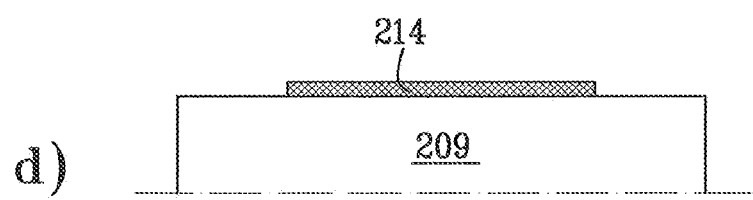
Figure 6:
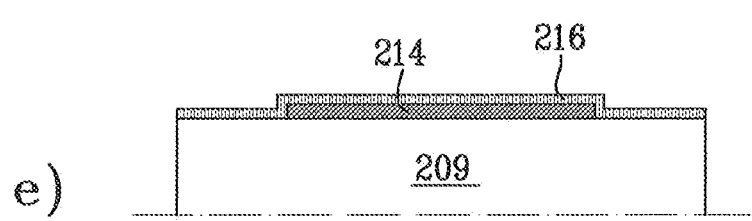
Figure 6:
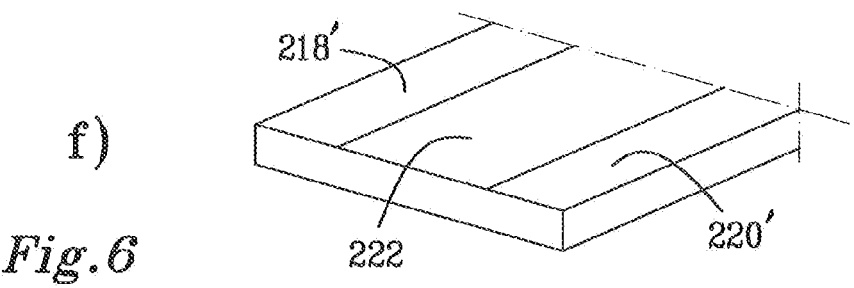

FIG. 6f illustrates the trim structure 200 of FIG. 6e in a perspective view. The trim structure 200 comprises three surface regions. Two of them 218', 220' have the first surface appearance, wherein the trim structure body 209 is seen through the second protective coating 216. There is also another surface region 222 having a second surface appearance, wherein the paint layer 214 is seen through the second protective coating 216.

In an alternative method (not illustrated) the first and or second surface appearance may be provided by means of anodising. Further, anodising may be combined by dyeing of the anodised layer in order to obtain a colored layer.

The step of removing paint 214, see FIGS. 5d and 6d, may comprise grinding, milling, laser cutting and/or polishing.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

What is claimed is:

1. A method for providing a trim structure for a vehicle with at least two surface regions having different surface appearances, the method comprising:

a) providing a first surface appearance on at least a portion of an external surface of a trim structure body by applying a first paint layer;
b) providing a second surface appearance by applying a second paint layer at least partly directly on top of the first paint layer or at least partly directly on top of an overcoating on the first paint layer;
c) removing a portion of the second paint layer, thereby revealing at least a portion of the under-lying first paint layer; and
bending the trim structure in order to achieve a curved shape that is adapted to fit around at least a part of a window or a grill of the vehicle, wherein the bending is performed before steps a)-c);
wherein the overcoating, if used, remains part of the trim structure.

2. The method according to claim 1 wherein step a) is followed by a step of applying a protective coating on top of at least a part of the first paint layer to form the overcoating.

3. The method of claim 1 further comprising applying a protective coating on top of at least a part of the second paint layer.

4. The method according to claim 1 wherein:
step b) comprises applying the second paint layer on at least a portion of an external surface of the trim structure body; and
step c) comprises removing a portion of the second paint layer, thereby revealing at least a portion of the under-lying external surface of the trim structure body.

5. The method of claim 4 further comprising applying a protective coating on top of at least a part of the surface of the trim structure body and/or on top of the second paint layer.

6. The method according to claim 1 wherein step c) comprises grinding, milling, laser cutting and/or polishing in order to remove the portion of the second paint layer.

7. The method according to claim 1 further comprising forming an end cap in one unit with the trim structure at an end of the trim structure.

8. The method according to claim 1 wherein the trim structure is adapted to form a front upper trim structure for positioning along a front side window, a rear upper trim structure for positioning along a rear side window, or a one-piece grill trim structure shaped to fit the grill.

9. A method for providing a trim structure for a vehicle with at least two surface regions having different surface appearances, the method comprising:
a) providing a first surface appearance on at least a portion of an external surface of a trim structure body by applying a first paint layer;
b) providing a second surface appearance by applying a second paint layer at least partly directly on top of the first paint layer or at least partly directly on top of an overcoating on the first paint layer; and
c) removing a portion of the second paint layer, thereby revealing at least a portion of the under-lying first paint layer;
wherein the overcoating, if used, remains part of the trim structure.

10. The method according to claim 9 further comprising bending the trim structure in order to achieve a curved shape.

11. The method according to claim 10 wherein the bending is performed before steps a)-c).

12. The method according to claim 10 wherein the bending is performed such that the trim structure is curved in a longitudinal direction of the trim structure.

13. The method according to claim 9 wherein step a) is followed by a step of applying a protective coating on at least a part of the first paint layer to form the overcoating, and step c) is followed by a step of applying a protective coating on at least a part of the second paint layer.

14. The method according to claim 9 further comprising applying a protective coating on top of at least a part of the first paint layer to form the overcoating.

15. The method according to claim 9 wherein step c) comprises grinding, milling, laser cutting and/or polishing in order to remove the portion of the second paint layer.

16. The method according to claim 9 further comprising applying a protective coating on top of at least a part of the second paint layer.

17. A method for providing a trim structure for a vehicle with at least two surface regions having different surface appearances, the method comprising:
a) providing a first surface appearance on at least a portion of an external surface of a trim structure body;
b) providing a second surface appearance by applying a material layer directly on top of at least a part of the at least a portion having the first surface appearance, or directly on top of an overcoating on the at least a part of the at least a portion having the first surface appearance; and
c) removing a portion of the applied material layer, thereby revealing at least a portion of the under-lying first surface appearance; and
bending the trim structure in order to achieve a curved shape that is adapted to fit around at least a part of a window or a grill of the vehicle, wherein the bending is performed before steps a)-c);
wherein the overcoating, if used, remains part of the trim structure.

18. The method according to claim 17 wherein the trim structure is curved to form a front upper trim structure for positioning along a front side window, a rear upper trim structure for positioning along a rear side window, or a one-piece grill trim structure shaped to fit the grill.

19. The method according to claim 17 wherein the bending is performed such that the trim structure is curved in a longitudinal direction of the trim structure.

* * * * *